(12) United States Patent
Chang et al.

(10) Patent No.: US 6,214,759 B1
(45) Date of Patent: Apr. 10, 2001

(54) METHOD FOR PRODUCING A TI/V SUPPORTED CATALYST FOR ETHYLENE POLYMERIZATION AND ETHYLENE/α-OLEFIN COPOLYMERIZATION

(75) Inventors: Ho-Sik Chang; Youn-Kyung Kang, both of Taejeon (KR)

(73) Assignee: Samsung General Chemicals Co., Ltd., Chungnam Province (KR)

( * ) Notice: Subject to any disclaimer, the term of this patent is extended or adjusted under 35 U.S.C. 154(b) by 0 days.

(21) Appl. No.: 09/291,734

(22) Filed: Apr. 14, 1999

(30) Foreign Application Priority Data

Apr. 17, 1998 (KR) .................................................. 98-13709

(51) Int. Cl.$^7$ ............................. B01J 21/00; B01J 21/10; B01J 23/00; B01J 23/20; B01J 23/22

(52) U.S. Cl. ....................... 502/103; 502/103; 502/104; 502/113; 502/115; 502/118; 502/128; 526/90; 526/123.1; 526/124.2; 526/124.3; 526/125.2

(58) Field of Search .................................. 502/103, 113, 502/115, 118, 128

(56) References Cited

U.S. PATENT DOCUMENTS

| | | | |
|---|---|---|---|
| 3,878,124 | * 4/1975 | Durand et al. | 252/429 |
| 4,069,169 | 1/1978 | Toyoda et al. | 252/429 B |
| 4,071,672 | 1/1978 | Kashiwa | 526/122 |
| 4,071,674 | 1/1978 | Kashiwa et al. | 526/125 |
| 4,076,924 | 2/1978 | Toyota et al. | 526/125 |
| 4,085,276 | 4/1978 | Toyota et al. | 526/122 |
| 4,107,413 | 8/1978 | Giannini et al. | 526/114 |
| 4,107,414 | 8/1978 | Giannini et al. | 526/114 |
| 4,156,063 | 5/1979 | Giannini et al. | 526/114 |
| 4,157,435 | 6/1979 | Toyota et al. | 526/125 |
| 4,187,196 | 2/1980 | Giannini et al. | 252/429 |
| 4,220,554 | 9/1980 | Scatá et al. | 252/129 B |
| 4,226,963 | 10/1980 | Giannini et al. | 526/114 |
| 4,315,835 | 2/1982 | Sactá et al. | 252/429 B |
| 4,315,874 | 2/1982 | Ushida et al. | 264/5 |
| 4,330,649 | 5/1982 | Kioka et al. | 526/125 |
| 4,336,360 | 6/1982 | Giannini et al. | 526/114 |
| 4,399,054 | 8/1983 | Ferraris et al. | 252/429 B |
| 4,401,589 | 8/1983 | Kioka et al. | 252/429 B |
| 4,439,540 | 3/1984 | Cecchin et al. | 502/125 |
| 4,613,655 | 9/1986 | Longi et al. | 526/114 |
| 4,806,433 | 2/1989 | Sasaki et al. | 502/115 |
| 4,866,022 | 9/1989 | Arzoumanidis et al. | 502/120 |
| 4,912,074 | 3/1990 | Miro | 502/104 |
| 4,946,816 | 8/1990 | Cohen et al. | 502/126 |
| 4,952,649 | 8/1990 | Kioka et al. | 526/125 |
| 4,978,648 | 12/1990 | Barbé et al. | 502/127 |
| 4,988,656 | 1/1991 | Arzoumanidis et al. | 502/127 |
| 4,990,479 | 2/1991 | Ishimaru et al. | 502/125 |
| 5,013,702 | 5/1991 | Arzoumanidis et al. | 502/120 |
| 5,059,570 | * 10/1991 | Bailly et al. | 502/104 |
| 5,081,090 | 1/1992 | Arzoumanidis et al. | 502/126 |
| 5,124,297 | 6/1992 | Arzoumanidis et al. | 502/120 |
| 5,134,104 | 7/1992 | Sasaki et al. | 502/103 |
| 5,175,332 | 12/1992 | Chatterton et al. | 556/482 |
| 5,182,245 | 1/1993 | Arzoumanidis et al. | 502/115 |
| 5,502,128 | 3/1996 | Flores et al. | 526/160 |
| 5,780,378 | 7/1998 | Toida et al. | 502/126 |
| 5,844,046 | 12/1998 | Ohgizawa et al. | 525/270 |
| 5,849,654 | 12/1998 | Fushimi et al. | 502/125 |
| 5,968,862 | * 10/1999 | Abbott et al. | 502/104 |

FOREIGN PATENT DOCUMENTS

| | | |
|---|---|---|
| 0 602 922 | 6/1994 | (EP) . |
| 0 606 125 | 7/1994 | (EP) . |
| 58-83006 | 5/1983 | (JP) . |
| 63-54004 | 10/1988 | (JP) . |

OTHER PUBLICATIONS

Invention Abstract for Pub. No. 63–191811 (JP), Pub. Date Aug. 9, 1988.

Invention Abstract for Pub. No. 63–40711 (JP), Pub. Date Dec. 13, 1994.

Tinkler et al., "Polymerisation of ethene by the novel titanium complex [Ti(Me$_3$SiN CH$_2$CH$_2$NSiMe$_3$) Cl$_2$]; a metallocene analogue," Chem. Commun., 1996, pp. 2623–2624.

Edelmann, "N–silylated benzamidines: versatile building blocks in main group and coordination chemistry," Coordination Chemistry Reviews, 137, 1994, pp. 403–481.

Zhou et al., "Synthesis and Structure of Novel Bridged Dinuclear Indium Complexes," Inorg. Chem. 1996, 35, pp. 1423–1424.

Zhou et al., "Bulky Amidinate Complexes of Tin(IV). Synthesis and Structure of Sn(RNC(R')NR)$_2$Cl$_2$ (R=Cyclohexyl, R'=H, Me; R=SiMe$_3$, R'=$^t$Bu)," Inorg. Chem. 1997, 36, pp. 501–504.

Linden et al., "Polymerization of α–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Phenoxide Titanium and Zirconium Species," J. Am. Chem. Soc. 1995, 117, pp. 3008–3021.

Stokes et al, "Reactions of Cobaloxime Anions and/or Hydrides with Enynes as a New, General Route to 1,3–and 1,2–Dienylcobaloxime Complexes," Organometallics 1996, 15, pp. 2624–2632.

* cited by examiner

*Primary Examiner*—Mark L. Bell
*Assistant Examiner*—Michael J. Di Verdi
(74) *Attorney, Agent, or Firm*—Conley, Rose & Tayon, P.C.

(57) ABSTRACT

The present invention relates to a method for producing a Ti/V supported catalyst useful in polymerization of ethylene and copolymerization of ethylene and α-olefin. The method includes a treatment, by a titanium compound and a vanadium compound, of the magnesium-containing carrier, which is obtained by reaction of an organomagnesium compound of the structure of MgPh$_2$.nMgCl$_2$.mR$_2$O (n=0.37~0.7; m≧1; R$_2$O=ether; Ph=phenyl) with an organic chloride compound in a mole ratio of organic chloride compound/Mg≧0.5, at −20~80° C. According to the method for producing the catalyst, it is possible to provide a catalyst which can control the distribution of molecular weight, and when polymerization is performed using this catalyst, it is possible to restrain the inactivation and to secure a sufficient activity. Moreover, the polymer produced by the use of this catalyst proves to have a high bulk density and an adjusted particle size distribution.

16 Claims, No Drawings

METHOD FOR PRODUCING A TI/V SUPPORTED CATALYST FOR ETHYLENE POLYMERIZATION AND ETHYLENE/α-OLEFIN COPOLYMERIZATION

FIELD OF INVENTION

The present disclosure relates to a method for producing a catalyst for use in polymerization of ethylene and copolymerization of ethylene and α-olefin, and more particularly to a method for producing a supported catalyst including a transition metal wherein a titanium compound and a vanadium compound are mixed together in a magnesium-containing carrier of a narrow particle size distribution.

BACKGROUND OF INVENTION

By the co-inventors of the subject invention a method was developed some time ago for producing a supported catalyst for polymerization of ethylene and copolymerization of ethylene and α-olefin, by following the way of coating the catalysts with a transition metal compound, that is, first reacting an organomagnesium compound having the structure of $MgPh_2 \cdot nMgCl_2 \cdot mR_2O$ (here, n=0.37~0.7; m≧2; $R_2O$=ether; Ph=phenyl) with an organic halide, and next coating the thus produced carrier with such transition metal compounds as $TiCl_4$, $VCl_4$, or $VOCl_3$ (Japanese Patent Application No. 330675/1995).

The catalyst produced by this publicly known art, particularly the catalyst produced by coating a carrier with $VCl_4$ marked an advance in part of the polymerization processes by producing polymers of a narrow particle size distribution and an increased bulk density, yet it is found to accompany such problems as yielding polymers of an uncontrolling broad molecular weight distribution and a gradual inactivation of the active substance of vanadium during polymerization.

Meanwhile, a process has been known for producing a catalyst by first reacting magnesium-aluminum-alkyl compound ($RMgR_1$-$nAlR_3$-$mD$) and hydrocarbon chloride, and then reacting the thus obtained solid product (carrier) with a titanium or a vanadium halide (German Patent Application No. 3636060: French Patent Application No. 2529207). In this process, (n-Bu)Mg(i-Bu) or (n-Bu)Mg(OCl) dissolved in hydrocarbon is used as an organomagnesium compound, RMgR', and tert-BuCl is used as hydrocarbon chloride. The main defect of this process is found in the insufficient activity of the produced catalyst.

EP Application EP-A-0, 155,770 is publicly known to teach the production of a catalyst by precipitating a vanadium compound on an elliptical support of magnesium chloride including a composition which contains an electron-donating compound. This catalyst is used in production of ethylene polymers of a wide molecular weight distribution. This catalyst, however, has a defect in that although only a little quantity of vanadium compound is fixed on the support, a relatively large quantity of vanadium compound is required for the purpose. In the performance of washing the catalyst it is generally required to remove the surplus vanadium compound which has not been fixed on the support, and this removal costs much money and is troublesome, because of its toxicity and corrosive properties.

It is publicly known that a polyethylene resin requires a proper molecular weight distribution respectively for different production processes.

Hence, it is required either to adopt a multiple-stage of reactors to produce polyethylenes of different molecular weights from one another from the respective reactors, for control of molecular weight distributions, or alternatively, to develop, by the use of a particular catalyst-activating substance, a catalyst capable of controlling polymers' molecular weight distributions. A multiple-stage of reactors will naturally require a heavy initial investment of capital, and therefore it is preferable to secure a catalyst which can control polymers' molecular weight distributions.

SUMMARY OF INVENTION

In one embodiment, the invention relates to a method for producing a catalyst which will make it possible to produce a polymer of a narrow particle size distribution and an increased bulk density; can control polymer's molecular weight distributions when slurry or gaseous polymerization of ethylene or copolymerization of ethylene and α-olefin is performed; and/or can maintain sufficient activity during polymerization by inhibiting the inactivation of the active substance of vanadium is described.

DETAILED DESCRIPTION OF INVENTION

The method for producing the catalyst is characterized in that the magnesium-containing carrier obtained by reacting an organomagnesium compound, $MgPh_2 \cdot nMgCl_2 \cdot mR_2O$ (here, n=0.37~0.7; m≧1; $R_2O$=ether; Ph=phenyl), with an organic chloride compound, is treated with a titanium compound and a vanadium compound.

The magnesium-containing carrier is produced by reacting, at −20 to 80° C., a solution of the organomagnesium compound with one or more organic chlorides, preferably carbon tetrachloride, in a mole ratio of organic chloride compound/Mg≧0.5. The suspension of the carrier powder containing magnesium, obtained at this stage, has a particular particle size and a narrow particle size distribution.

The organomagnesium compound used when the magnesium-containing carrier is produced is obtained by reacting magnesium in powder form and chlorobenzene in the presence of more than one electron-donating compounds. The electron-donors may include aliphatic ether and cyclic ether. The aliphatic ethers, here, can be represented by a general formula of $R^2OR^3$ where the $R^2$ and $R^3$ are identical or different alkyl radicals with two to eight carbons, and preferably an aliphatic ether having four to five carbons. The cyclic ethers are those having three or four carbons. The most preferable as electron donors are dibutyl or diisoamylethers.

For the organic chloride compound used in the present invention for producing a magnesium-containing carrier are used such compounds with a general formula $CR'_nCl_{(4-n)}$ are used (here, n is an integer from 0 to 3), wherein R' is an alkyl radical with the number of carbons ranging from 1 to 12.

In the method for production of the catalyst in the present invention, in the process of forming the magnesium-containing carrier, a complex of organomagnesium compounds $[MgPh_2 \cdot nMgCl_2 \cdot mR_2O]$ is used in the state of solution, dissolved in chlorobenzene, ether ($R_2O$), or a mixture of chlorobenzene and ether, or a mixture of chlorobenzene and aliphatic or aromatic compounds.

The aforesaid organomagnesium compound in the state of solution is chlorinated with organic chloride in the mole ratio of the organic chloride compound/Mg≧0.5, at −20 to 80° C. The organic chloride diluted in a hydrocarbon solvent can be used in the chlorination of organomagnesium compound. And in this way, a carrier with the magnesium in powder form suspended in the solvent is produced. The carrier obtained in this way possesses a narrow particle size distribution. The particle sizes of the carrier and the catalyst can be adjusted in the range from 5 to 150$\mu$m according to the conditions of the composition of the organomagnesium compounds and of the reaction of the organomagnesium compounds and the organic chloride compound.

The magnesium-containing carrier obtained as above contains, in the main, magnesium dichloride (80~90 wt %), ether (7~15 wt %), and a hydrocarbon complex (1~5 wt %). The carrier may be treated with an organic aluminum compound in the Al/Ti mole ratio of 0.1~2, before treatment with a titanium or a vanadium compound.

The preferable Al/Ti mole ratio is 0.5~1.5, the preferable temperature being 0~80° C. For the organoaluminum compound, the method uses such an organoalkylaluminum having the general formula of $AlR'_nX_{(3-n)}$ or an organic aluminum halogen compound. Here, R' stands for an alkyl group having 1 to 16, more preferably 2 to 12 carbons, X for chlorine, bromine, and other halogen compound, and n an integer from 0 to 3, or fractions. Such organic aluminum compounds falling within the category include triethylaluminum, triisobutylaluminum, trihexylaluminum, trioctylaluminum, ethylaluminum chloride, methylaluminum chloride, ethylaluminum sesquibromide, isobutylaluminum sesquichloride, dimethylaluminum chloride, diethylaluminum chloride, diethylaluminum bromide, diethylaluminum iodide, di-n-propylaluminum chloride, di-n-butylaluminum chloride, diisobutylaluminum chloride, di-n-octylaluminum iodide, methylaluminum dichloride, ethylaluminum dichloride, isobutylaluminum dichloride, n-butylaluminum dichloride, etc. Of all these, the more favorable organic aluminum compound can be selected from dialkylaluminum chlorides or from ethylaluminum sesquichlorides.

The catalyst of the present invention is obtained by treating the magnesium-containing carrier produced as above with one or more vanadium compounds and one or more titanium compounds in the V/Mg mole ratio of 0.01~1.0 and the V/Ti mole ratio of 0.5~200 in a hydrocarbon solvent at 20~100° C. Astounding is that when a catalyst is produced with the use of a vanadium and a titanium compound in such ratios, the catalyst displays 1.2 times to twice as high activity per g-catalyst as when vanadium is used alone; and it has been learned that the polymer or copolymer obtained thereby has a broader molecular weight distribution than when titanium was used alone, and the degree of the molecular weight distribution can be adjusted according to the quantity of the titanium compound used.

In the present invention, a vanadium compound may be diluted in an organic chloride for use. The organic chloride used for this purpose can be represented by a general formula $CR_nCl_{(4-n)}$, wherein n is an integer of from 0 to 3, and R is an alkyl radical having from 1 to 12 carbons. In the process of treating the carrier with a vanadium compound, or with a mixture of vanadium and titanium, the activity of the catalyst is prevented from declining, for the vanadium compound is more stable when diluted in an organic chloride than when the vanadium compound is used alone without dilution in an organic chloride.

When the magnesium carrier is treated in the present invention with a titanium and a vanadium compounds, it may be done with both of them together, or with them one by one, or both the compounds may be mixed for the treatment with the mixture.

In an embodiment, the vanadium compound should be of quadrivalent at highest, or VO vanadyl group of trivalent at most. The vanadium compound has the general formula, $V(OR)_{4-n}X_n$, or $VO(OR)_{3-m}X_m$. Here, characteristically, R represents an aliphatic or aromatic hydrocarbon group with 1 to 14 carbons, or COR' (R' representing an aliphatic or aromatic hydrocarbon group with 1 to 14 carbons), X representing Cl, Br, I, or what is selected from a group of their mixtures. And, n represents an integer from 0 to 4, or the fraction and m an integer from 0 to 3, or the fraction. Such compounds include, for example, vanadium tetrachloride, vanadyl trichloride, vanadyl tri-n-propoxide, vanadyl triisopropoxide, vanadyl tri-n-butoxide, vanadyl tetra-n-butoxide, vanadyl tetra-n-propoxide, etc. One or more compounds selected from among these are to be put to use herein.

The titanium compound used in the present invention has the general formula, $Ti(OR)_aX_{4-a}$. R represents an aliphatic or aromatic hydrocarbon group having 1 to 14 carbons, or alternatively, COR' (here, R' represents an aliphatic or aromatic hydrocarbon group having 1 to 14 carbons), X represents Cl, Br, or I, and "a" representing 0, 1, 2, or 3. The preferable titanium compounds are titanium alkoxide or titanium alkoxy chloride, their examples including $TiCl_4$, $Ti(OC_3H_7)_4$, $Ti(OC_3H_7)_2Cl_2$, $Ti(OC_3H_7)Cl_3$, $Ti(OC_3H_7)_3Cl$, $Ti(OC_4H_9)_2Cl_2$, $Ti(OC_4H_9)Cl_3$, $Ti(OC_4H_9)_3$ Cl, $Ti(OCH_2CH(C_2H_5)(CH_2)_3CH_3)_2Cl_2$, and $Ti(OCH_2CH(C_2H_5)(CH_2)_3CH_3)Cl_3$.

After production of the catalyst, the catalyst may be treated with an organoaluminum compound in a mole ratio of Al/Ti=0.1~2.

The preferable Al/Ti mole ratio is 0.5~1.5, the preferable temperature being 0~80° C. For the organoaluminum compound, the present invention uses such an organoalkylaluminum having the general formula of $AlR'_nX_{(3-n)}$ or an organic aluminum halogen compound. Here, R' stands for an alkyl group having 1 to 16, more preferably 2 to 12 carbons, X for chlorine, bromine, and other halogen compounds, and n an integer from 0 to 3, or fractions. Such organic aluminum compounds falling within the category include triethylaluminum, triisobutylaluminum, trihexylaluminum, trioctylaluminum, ethylaluminum chloride, methylaluminum chloride, ethylaluminum sesquibromide, isobutylaluminum sesquichloride, dimethylaluminum chloride, diethylaluminum chloride, diethylaluminum bromide, diethylaluminum iodide, di-n-propylaluminum chloride, di-n-butylaluminum chloride, diisobutylaluminum chloride, di-n-octylaluminum iodide, methylaluminum dichloride, ethylaluminum dichloride, isobutylaluminum dichloride, n-butylaluminum dichloride, etc.

Of all these, the more preferable organic aluminum compound can be selected from dialkylaluminum chlorides or from ethylaluminum sesquichlorides.

The method in the present invention provides a catalyst which is highly-active, has a narrow particle size distribution and diverse average particle sizes, and is thus useful for various purposes.

For example, the present invention can produce a catalyst with the particle size of 5~10 $\mu$m and 10~15 $\mu$m, useful in slurry polymerization of ethylene;, and of 20~150 $\mu$m, useful in gaseous polymerization of ethylene. When both titanium and vadanium are used as the active substance of the catalyst, it is possible to obtain, accordant with the different ratios of mixture of these, both polyethylene and polyethylene copolymer with a narrow molecular weight distribution from polyethylene and polyethylene copolymer having a broad molecular weight distribution. A narrow molecular weight distribution is characterized by the melt index ratio, $MI_{21.6}/MI_{2.16}<30$, and a broad molecular weight distribution, by that of $MI_{21.6}/MI_{2.16}>100$.

The catalyst of the present invention is used in both ethylene polymerization and ethylene/α-olefin copolymerization. The catalyst of the present invention can be used together with one or more organic aluminum compounds, or preferably trialkylaluminum, as its cocatalyst.

The usable organic aluminum compound has a structural formula: $AlR_nX_{3-n}$. Here, R is an alkyl radical having 1 to 12 carbons; X a hydrogen atom, halogen atoms such as chlorine or fluorine and an alkoxy radical having 1 to 12 carbons; and n an integer of 1 to 3 or a fraction. For example, triisobutylaluminum, triethylaluminum, trimethylaluminum, tri-n-hexylaluminum, tri-n-octylaluminum, ethylaluminum sesquichloride, diethylaluminum chloride, etc. can be used.

The polymerization can be performed either in a hydrocarbon solvent (e.g., hexane or heptane) at 50 to 100° C. by a slurry polymerization process, or in the absence of a hydrocarbon solvent at 60~120° C. and under 2~4 atm pressure by a gaseous polymerization process. As an agent for adjusting the molecular weights of polymers hydrogen (5~90 bulk %) is used. Propylene, 1-butene, 1-hexene-4-methyl-1-pentene-1, and other α-olefin are useful in an ethylene/α-olefin copolymerization.

Below, an embodiment of the catalyst is described in further detail, referring to examples of its embodiment. Yet, the following examples do not limit the scope of the present invention.

COMPARATIVE EXAMPLE 1

<A> Production of organomagnesium compounds

Inside a 6-liter reactor equipped with stirrer and temperature controller 253.6 g of magnesium powder (10.44 mol) and 3183 ml of chlorobenzene (31.32 mol) were reacted in the presence of a solution in which 1799 ml of dibutylether (10.44 mol), 37 ml of butylchloride and 2.53 g of iodine as initiator were dissolved. The reaction was performed, while stirring, at 80~100° C. in an inactive gaseous atmosphere (nitrogen, argon) for 10 hours. Next, the reacted mixture was left alone, without stirring, for 12 hours, and then the liquid was separated from the precipitate. The liquid was a solution of the organomagnesium compound having the general formula, $MgPh_2 \cdot 0.49MgCl_2 \cdot 2(C_4H_9)_2O$, dissolved in chlorobenzene (the concentration of Mg being 1.4 mol per liter).

<B> Synthesis of carrier 3000 ml (Mg of 4.05 mol) of the solution obtained in <A> above was put in a reactor equipped with a stirrer, and 547 ml of $CCl_4$ (5.67 mol of $CCl_4$) dissolved in heptane of 547 ml was added to the reactor at 60° C., taking two hours. The mixture was stirred at the same temperature for 60 minutes, the solvent was removed, and the precipitate was washed in 200 ml of n-hexane at 60° C. four times. In this way, 400 g of carrier with the magnesium in powder form was obtained in the state of suspension in n-hexane.

<C> Production of catalyst 100 g of the thus obtained carrier was treated with an diethylaluminum chloride solution in the $AlEt_2Cl/Mg$ mole ratio of 1 at 40° C. for two hours, and then it was washed in 300 ml of n-hexane four times. The catalyst was synthesized by treating the carrier with a $VCl_4$, solution (18.6 ml of the solution of a concentration: 0.951 mol $VCl_4$/ml), of $CCl_4$ at 60° C. for an hour. The catalyst was washed in 70 ml of n-hexane twice. The catalyst thus obtained was determined as containing vanadium by 1.2 wt %, the average particle size being 20 μm. The physical properties of this catalyst are given in Table 1.

<Polymerization>

The ethylene polymerization was performed inside a 2-liter steel reactor equipped with a stirrer and a temperature controller. N-hexane (1000 mol) was used as hydrocarbon solvent, and 2 mmol of $Al(i-Bu)_3$ as cocatalyst. The polymerization was performed under 7.5 atm of ethylene pressure, under 910 cc(0° C., 1 atm) of hydrogen, at 80° C. for one hour.

The data on the results of the polymerization of ethylene are given in Table 1.

For the experiment, 0.015 mmol of vanadium was taken, and as a result 10 g of polymer was produced. The activity of the catalyst was 2.1 kg per gram of catalyst. The melt index (MI) of the polyethylene was 0.125 g/10 min under the load of 2.16 kg at 190° C.; the MI fraction of 21.6 kg to 2.16 kg was 110. The bulk density of the polyethylene powder was 0.36 g/cm³, the average particle size of the polyethylene was 450 μm by molecule-size analytical data, showing a narrow particle size distribution. The SPAN calculated from the molecule-size analytical data by the following formula was 0.6 or less: SPAN=(d90−d10)/d50. Here, d90, d50, and d10 indicate the sizes of polyethylene particles, the total contents of particles being 90, 50, and 10 wt %, respectively.

EXAMPLE 1

The same process was performed as in Comparative Example 1 except that the catalyst produced in Comparative Example 1 was reacted by $TiCl_4$ in a Ti/V mole ratio of 0.1 for one hour, and afterwards it was washed in 70 ml of n-hexane twice. The physical properties of the catalyst and the results of the polymerization are given in Table 1.

EXAMPLE 2

The same process was performed as in Comparative Example 1 except that the catalyst produced in Comparative Example 1 was reacted by $TiCl_4$ in a Ti/V mole ratio of 0.3 for one hour, and afterwards it was washed in 70 ml of n-hexane twice. The physical properties of the catalyst and the results of the polymerization are given in Table 1.

EXAMPLE 3

The same process was performed as in Comparative Example 1 except that the catalyst produced in Comparative Example 1 was reacted by $TiCl_4$ in a Ti/V mole ratio of 0.5 for one hour, and afterwards it was washed in 70 ml of n-hexane twice. The physical properties of the catalyst and the results of the polymerization are given in Table 1.

EXAMPLE 4

The same process was performed as in Comparative Example 1 except that the catalyst produced in Comparative Example 1 was reacted by $TiCl_4$ in a Ti/V mole ratio of 0.7 for one hour, and afterwards it was washed in 70 ml of n-hexane twice. The physical properties of the catalyst and the results of the polymerization are given in Table 1.

EXAMPLE 5

The same process was performed as in Comparative Example 1 except that $TiCl_4$ and $VCl_4$ were mixed in Ti/V mole ratio of 1.0 instead of using $VCl_4$ alone. The physical properties of the catalyst and the results of the polymerization are given in Table 1.

COMPARATIVE EXAMPLE 2

The carrier produced in <B> of Comparative Example 1 was reacted at 60° C. for one hour, after treatment in a Ti/Mg mole ratio of 1.0, and was washed in 70 ml of n-hexane four times, thus producing a Ti supported catalyst. The Ti-content of the thus produced catalyst was 0.7 wt %. An ethylene polymerization was carried out inside a 2-liter steel rector equipped with a stirrer and a temperature-controlling jacket. For the hydrocarbon solvent, n-hexane (1,000 mol) was used, and for cocatalyst 2 mmol of Al(i-Bu)3 was used. The polymerization was performed under 7.5 atm of ethylene pressure and 4.5 atm of hydrogen at 80° C., for one hour. The data of the results of this ethylene polymerization are given in Table 1.

EXAMPLE 6

The same process was performed as in Comparative Example 1 except that the catalyst produced in Comparative Example 2 was reacted with $VCl_4$ in a Ti/V mole ratio of 1.0 for one hour, and afterwards it was washed in 70 ml of n-hexane twice. The physical properties of the catalyst and the results of the polymerization are given in Table 1.

EXAMPLE 7

Making use of the catalyst obtained in Example 1 above, a copolymerization of ethylene and 1-hexene was performed. The polymerization was carried out by the same process as in Example 6, with the only exception that 30 cc of 1-hexene was used before the polymerization. As a result of the polymerization, a copolymer of ethylene and 1-hexene with a concentration of 0.945 g/cc was obtained. The results of the copolymerization are given in Table 1.

TABLE 1

Results of Experiments for Ethylene Polymerization Capability

| Exmps. | V (wt %) | Ti (wt %) | Activity Kg – PE/ gCat · hr | $MI_{2.16}$ | $MI_{21.6}/MI_{2.16}$ | BD (g/cc) | Span ratio |
|---|---|---|---|---|---|---|---|
| Comp. 1 | 1.7 | 0 | 2.12 | 0.125 | 111 | 0.37 | <0.6 |
| 1 | 1.27 | 0.16 | 5.01 | 0.013 | 135 | 0.32 | <0.6 |
| 2 | 1.32 | 0.29 | 4.85 | 0.018 | 82 | 0.31 | <0.6 |
| 3 | 1.33 | 0.38 | 5.19 | 0.012 | 77 | 0.32 | <0.6 |
| 4 | 1.1 | 0.16 | 3.89 | 2.86 | 62 | 0.32 | <0.6 |
| Comp. 2 | 0 | 0.7 | 4.4 | 7.5 | 27 | 0.42 | <0.6 |
| 5 | 1.32 | 0.3 | 6.97 | 0.015 | 109 | 0.31 | <0.6 |
| 6 | 2.84 | 0.49 | 11.42 | 0.03 | 92 | 0.367 | <0.6 |
| 7 | 1.27 | 0.16 | 6.52 | 0.12 | 125 | 0.315 | <0.6 |

[Effects of Invention]

In one embodiment a catalyst which can control the molecular weight distribution is provided, and therefore when polymerization is performed, making use of this catalyst, the inactivation is inhibited and sufficient activity is secured. The polymer produced with the use of this catalyst has an optimal bulk density and a well adjusted particle size distribution.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for producing a catalyst for polymerization of ethylene and for copolymerization of ethylene and α-olefin, comprising:

reacting an organomagnesium compound having the structure of $MgPh_2.nMgCl_2.mR_2O$, wherein Ph=phenyl, n=0.37–0.7, m≧1, $R_2O$ is an ether, with an organic chloride compound to form a magnesium-containing carrier, wherein the organic chloride compound/Mg mole ratio is about 0.5 or more, and wherein the reaction is performed at a temperature of about −20–80° C., and treating the magnesium-containing carrier with a titanium compound and a vanadium compound, wherein the vanadium compound is mixed with an organic chloride represented by a general formula $CR_nCl_{(4-n)}$, wherein n is an integer from 0 to 3, and R is an alkyl radical having from 1 to 12 carbons.

2. The method according to claim 1, wherein said organomagnesium compound is produced by reacting metallic magnesium with chlorobenzene in the presence of dibutyl ether or diisoamylether.

3. The method according to claim 1, wherein said titanium compound is represented by the general formula of $Ti(OR)_aX_{4-a}$, wherein R represents an aliphatic or an aromatic hydrocarbon group having from 1 to 14 carbons, or COR', wherein R' is an aliphatic or aromatic hydrocarbon group having from 1 to 14 carbons, wherein X is Cl, Br, or I, and wherein a is 0, 1, 2, or 3.

4. The method according to claim 1, wherein said vanadium compound is represented by the general formula of $(VOR)_{4-n}X_n$ or $VO(OR)_{3-m}X_m$, wherein R represents an aliphatic or an aromatic hydrocarbon group having from 1 to 14 carbons, or COR', wherein R' is an aliphatic or aromatic hydrocarbon group having from 1 to 14 carbons, wherein X is Cl, Br, or I, n is an integer from 1–4 or a fraction, and m is an integer from 0–3 or a fraction.

5. The method according to claim 1, wherein the V/Ti mole ratio is 0.5~200.

6. The method according to claim 1, wherein said magnesium-containing carrier is treated with the titanium compound after it is treated with the vanadium compound.

7. The method according to claim 1, wherein said magnesium-containing carrier is treated with the vanadium compound after it is treated with the titanium compound.

8. The method according to claim 1, wherein said magnesium-containing carrier is substantially simultaneously treated with the titanium compound and the vanadium compound.

9. The method according to claim 1, wherein said magnesium-containing carrier is treated with a mixture of the titanium compound and the vanadium compound, said mixture being prepared in advance.

10. The method according to claim 1, wherein said magnesium-containing carrier is treated with an organic aluminum compound prior to treating the magnesium-containing carrier with the titanium compound and the vanadium compound, wherein the Al/Ti mole ratio is between about 0.1–2.

11. A catalyst for polymerization of ethylene and for copolymerization of ethylene and an α-olefin, formed by the method comprising:

reacting an organomagnesium compound having the structure of $MgPh_2 \cdot nMgCl_2 \cdot mR_2O$, wherein Ph=phenyl, n=0.37–0.7, m≧1, $R_2O$ is an ether, with an organic chloride compound to form a magnesium-containing carrier, wherein the organic chloride compound/Mg mole ratio is about 0.5 or more, and wherein the reaction is performed at a temperature of about −20–80° C., and treating the magnesium-containing carrier with a titanium compound and a vanadium compound, wherein the vanadium compound is mixed with an organic chloride represented by a general formula $CR_nCl_{(4-n)}$, wherein n is an integer from 0 to 3, and R is an alkyl radical having from 1 to 12 carbons.

12. The catalyst of claim 11, wherein the organomagnesium compound is produced by reacting metallic magnesium with chlorobenzene in the presence of an electron-donating compound.

13. The catalyst of claim 11, wherein the organic chloride compound has the general formula $CR'_nCl_{(4-n)}$, where R' is an alkyl group having between 1 to 12 carbons, and wherein n is 0, 1, 2, or 3.

14. The catalyst of claim 11, wherein the titanium compound is represented by the general formula of $Ti(OR)_aX_{4-a}$, wherein R represents an aliphatic or an aromatic hydrocarbon group having from 1 to 14 carbons, or COR', wherein R' is an aliphatic or aromatic hydrocarbon group having from 1 to 14 carbons, wherein X is Cl, Br, or I, and wherein a is 0, 1, 2, or 3.

15. The catalyst of claim 11, wherein the vanadium compound is represented by the general formula of $(VOR)_{4-n}X_n$ or $VO(OR)_{3-m}X_m$, wherein R represents an aliphatic or an aromatic hydrocarbon group having from 1 to 14 carbons, or COR', wherein R' is an aliphatic or aromatic hydrocarbon group having from 1 to 14 carbons, wherein X is Cl, Br, or I, n is an integer from 1–4 or a fraction, and m is an integer from 0–3 or a fraction.

16. The catalyst of claim 11, wherein said magnesium-containing carrier is treated with an organic aluminum compound prior to treating the magnesium-containing carrier with the titanium compound and the vanadium compound.

* * * * *